US011580505B2

(12) United States Patent
Welch

(10) Patent No.: US 11,580,505 B2
(45) Date of Patent: Feb. 14, 2023

(54) METHODS FOR FACILITATING FUNDS DISBURSEMENTS AND DEVICES THEREOF

(71) Applicant: JPMorgan Chase Bank, N.A., New York, NY (US)

(72) Inventor: Johnathan Welch, Riverview, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 25 days.

(21) Appl. No.: 17/395,826

(22) Filed: Aug. 6, 2021

(65) Prior Publication Data

US 2021/0365901 A1    Nov. 25, 2021

Related U.S. Application Data

(63) Continuation of application No. 16/416,808, filed on May 20, 2019, now Pat. No. 11,144,892.

(Continued)

(51) Int. Cl.
| | |
|---|---|
| *G06Q 20/00* | (2012.01) |
| *G06Q 20/04* | (2012.01) |
| *G06Q 20/10* | (2012.01) |
| *G06Q 20/38* | (2012.01) |
| *G06Q 20/40* | (2012.01) |

(Continued)

(52) U.S. Cl.
CPC ....... *G06Q 20/042* (2013.01); *G06Q 20/1085* (2013.01); *G06Q 20/385* (2013.01); *G06K 19/06037* (2013.01); *G06Q 20/3278* (2013.01); *G06Q 20/40145* (2013.01)

(58) Field of Classification Search
USPC ............ 705/43, 40, 39, 38, 37, 26; 709/217, 709/218; 700/245; 235/375
See application file for complete search history.

(56) References Cited

U.S. PATENT DOCUMENTS

| | | | |
|---|---|---|---|
| 7,562,304 B2 * | 7/2009 | Dixon ................ | G06Q 30/0251 715/765 |
| 2004/0210449 A1 * | 10/2004 | Breck .................... | G06Q 20/04 705/39 |

(Continued)

FOREIGN PATENT DOCUMENTS

WO    WO 2017/196816 A1    11/2017

OTHER PUBLICATIONS

An Overview of the EMV Protocol and Its Security Vulnerabilities; 2018 Fourth International Conference on Mobile and Secure Services (MobiSecServ) (pp. 1-5); Nour El Madhoun, Emmanuel Bertin, Guy Pujolle, Feb. 24, 2018. (Year: 2018).*

(Continued)

*Primary Examiner* — Tien C Nguyen
(74) *Attorney, Agent, or Firm* — Greenblum & Bernstein, P.L.C.

(57) ABSTRACT

Systems and methods for facilitating a disbursement of funds to a payee are provided. The methods include receiving a payment request from a payor; generating a code, such as barcode, a Quick Response (QR) code, a Near Field Communication (NFC) code, or a textual string, that corresponds to the received payment request; transmitting the generated code to the payee; validating the code when the code is entered into a payment disbursement machine, such as an automated teller machine; and disbursing at least one of the funds and a payment voucher via the payment disbursement machine.

20 Claims, 5 Drawing Sheets

Related U.S. Application Data

(60) Provisional application No. 62/673,476, filed on May 18, 2018.

(51) Int. Cl.
*G06K 19/06* (2006.01)
*G06Q 20/32* (2012.01)

(56) References Cited

U.S. PATENT DOCUMENTS

| | | | | |
|---|---|---|---|---|
| 2005/0269402 | A1* | 12/2005 | Spitzer | G06Q 20/385 235/449 |
| 2006/0235796 | A1* | 10/2006 | Johnson | G06Q 20/4014 705/26.1 |
| 2007/0288377 | A1* | 12/2007 | Shaked | G06Q 30/06 235/380 |
| 2012/0173431 | A1* | 7/2012 | Ritchie | G06Q 20/367 705/65 |
| 2017/0039559 | A1* | 2/2017 | Frieden | G06Q 20/40 |
| 2017/0132593 | A1* | 5/2017 | Block | G06Q 20/3223 |
| 2017/0357954 | A1* | 12/2017 | Tribble | G06Q 20/401 |

OTHER PUBLICATIONS

M-Payment systems: Technologies and business models; 2014 Euro Med Telco Conference (EMTC) (pp. 1-6); Alessandro Vizzarri, Francesco Vatalaro; Nov. 12, 2014. (Year: 2014).*

International Search Report and PCT Written Opinion dated Jul. 25, 2019 in corresponding International Application No. PCT/US19/33080.

Responsibility of Net-bank in Electronic Payment, 2008 International Symposium on Electronic Commerce and Security (pp. 771-775), Liu Han-Xia, Li Rong, Jun.-Oct. 2008. (Year: 2008).

* cited by examiner

METHODS FOR FACILITATING FUNDS DISBURSEMENTS AND DEVICES THEREOF

CROSS-REFERENCE TO RELATED APPLICATIONS

This is a continuation application of U.S. patent application Ser. No. 16/416,808, filed May 20, 2019, which claims priority to U.S. Provisional Patent Application No. 62/673,476, filed May 18, 2018. The disclosure of each of the above-mentioned documents, including the specification, drawings, and claims, is incorporated herein by reference in its entirety.

BACKGROUND

1. Field of the Disclosure

This technology generally relates to methods and systems for facilitating funds disbursements, and more particularly, to methods and systems for facilitating funds disbursements to persons that lack individual bank accounts and/or persons that prefer to receive cash payments.

2. Background Information

Corporate entities are often faced with situations that require them to issue a payment or refund to a customer, such as, for example, when an airline loses a passenger's luggage. In these situations, corporations encounter difficulties making payments to individuals without immediate and ready access to a bank account or similar instrument, i.e., the unbanked population. These corporations will often issue paper checks or prepay cards to an unbanked payee. However, these instruments have inherent security risks, and may introduce unnecessary complexity to the payment process.

Conventional Automated Teller Machines (ATMs) have long functioned as an integral tool for the disbursement of cash from a financial institution to a user. Recently, Smart ATMs have been utilized to enhance or supplement traditional ATM features. Smart ATMs may be connected over a network to a financial institution to access enhanced software applications, or may have added hardware capabilities, such as high-resolution cameras, Near Field Communication (NFC) readers, fingerprint capabilities, and the like. The enhanced capabilities of Smart ATMs enable financial institutions to ensure increased security with respect to financial interactions between corporations and customers and payees.

By leveraging Smart ATM features, it is possible for financial institutions to offer corporate clients improved payment methods for serving the unbanked population.

SUMMARY

The present disclosure, through one or more of its various aspects, embodiments, and/or specific features or sub-components, provides, inter alia, various systems, servers, devices, methods, media, programs, and platforms for facilitating a disbursement of funds to a payee. The various aspects, embodiments, features, and/or sub-components provide optimized processes of facilitating a disbursement of funds to a payee.

According to an aspect of the present disclosure, a method for facilitating a disbursement of funds to a payee is provided. The method is implemented by a processor on a computing device. The method includes: receiving a payment request from a payor; generating a code that corresponds to the received payment request; transmitting the generated code to the payee; validating the code when the code is entered into a payment disbursement machine; and disbursing at least one of the funds and a payment voucher via the payment disbursement machine.

The payment disbursement machine may be an automated teller machine (ATM).

The payment request may be received from the payor via a wireless mobile communication device, such as, for example, a smart phone.

The disbursing may include disbursing the payment voucher when at least one of a funds availability restriction, an identification verification restriction, and a general payment disbursement machine restriction is applicable to the payee.

The payment voucher may be redeemable at a financial institution for facilitating the disbursement of funds.

The code may be a single-use code that is unusable after a first use.

The single-use code may be configured to expire when a predetermined amount of time has elapsed from the generating of the code.

The method may further include authenticating the payee after receiving the payment request and before generating the code.

The authenticating may be performed by using image data of the payee, using video data of the payee, using fingerprint data of the payee, and/or using facial recognition data of the payee.

The code may include at least one of a barcode, a Quick Response (QR) code, a Near Field Communication (NFC) code, and a textual string.

According to another aspect of the present disclosure, a computing device configured to implement an execution of a method for facilitating a disbursement of funds to a payee is provided. The computing device includes a display screen, a processor, a memory, and a communication interface coupled to each of the processor, the memory, and the display screen. The processor is configured to: receive a payment request from a payor; generate a code that corresponds to the received payment request; transmit the generated code to the payee; validate the code when the code is entered into a payment disbursement machine; and effect the disbursement of at least one of the funds and a payment voucher via the payment disbursement machine.

The payment disbursement machine may be an automated teller machine (ATM).

The payment request may be received from the payor via a wireless mobile communication device, such as, for example, a smart phone.

The processor may be further configured to effect the disbursement of the payment voucher when at least one of a funds availability restriction, an identification verification restriction, and a general payment disbursement machine restriction is applicable to the payee.

The payment voucher may be redeemable at a financial institution for facilitating the disbursement of funds.

The code may be a single-use code that is unusable after a first use.

The single-use code may be configured to expire when a predetermined amount of time has elapsed from a time at which the code is generated.

The processor may be further configured to authenticate the payee after the payment request is received and before the code is generated.

The processor may be further configured to authenticate the payee by using at least one of image data of the payee, video data of the payee, fingerprint data of the payee, and facial recognition data of the payee.

The code may include at least one of a barcode, a Quick Response (QR) code, a Near Field Communication (NFC) code, and a textual string.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
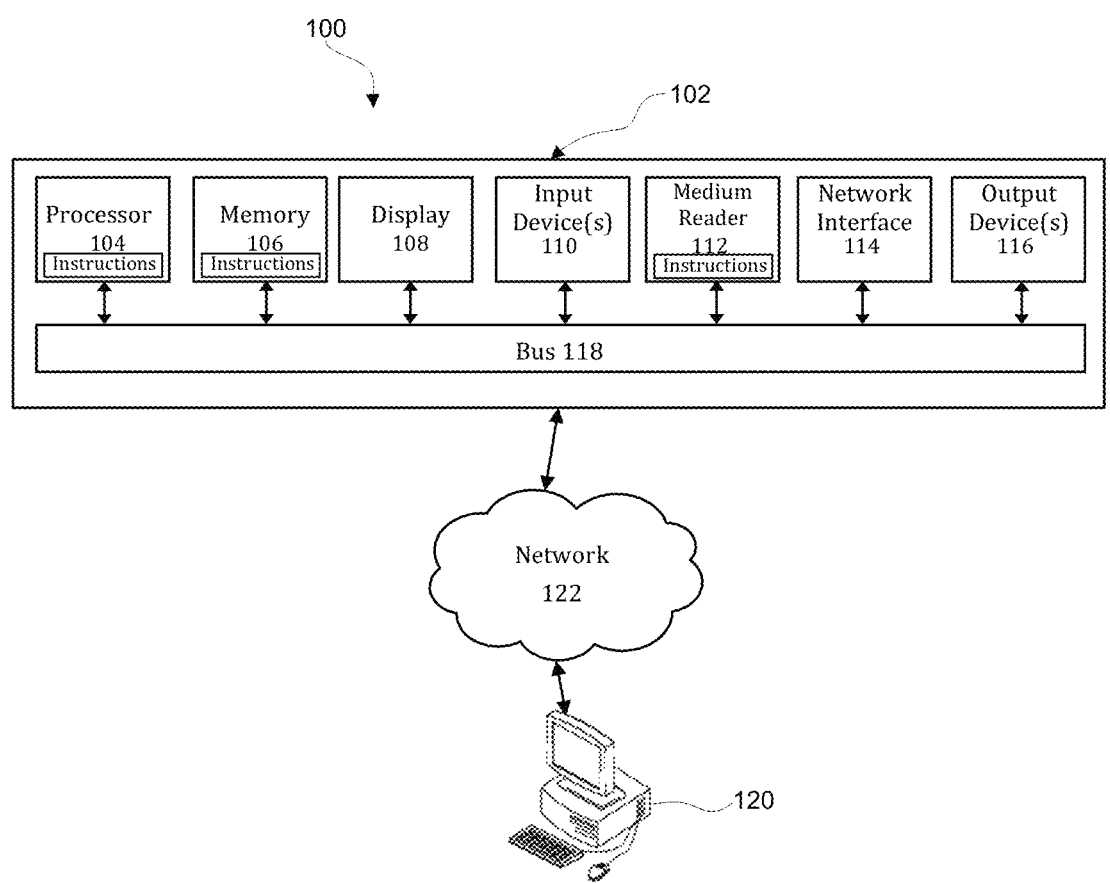
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of facilitating a disbursement of funds to a payee.

Figure 2:
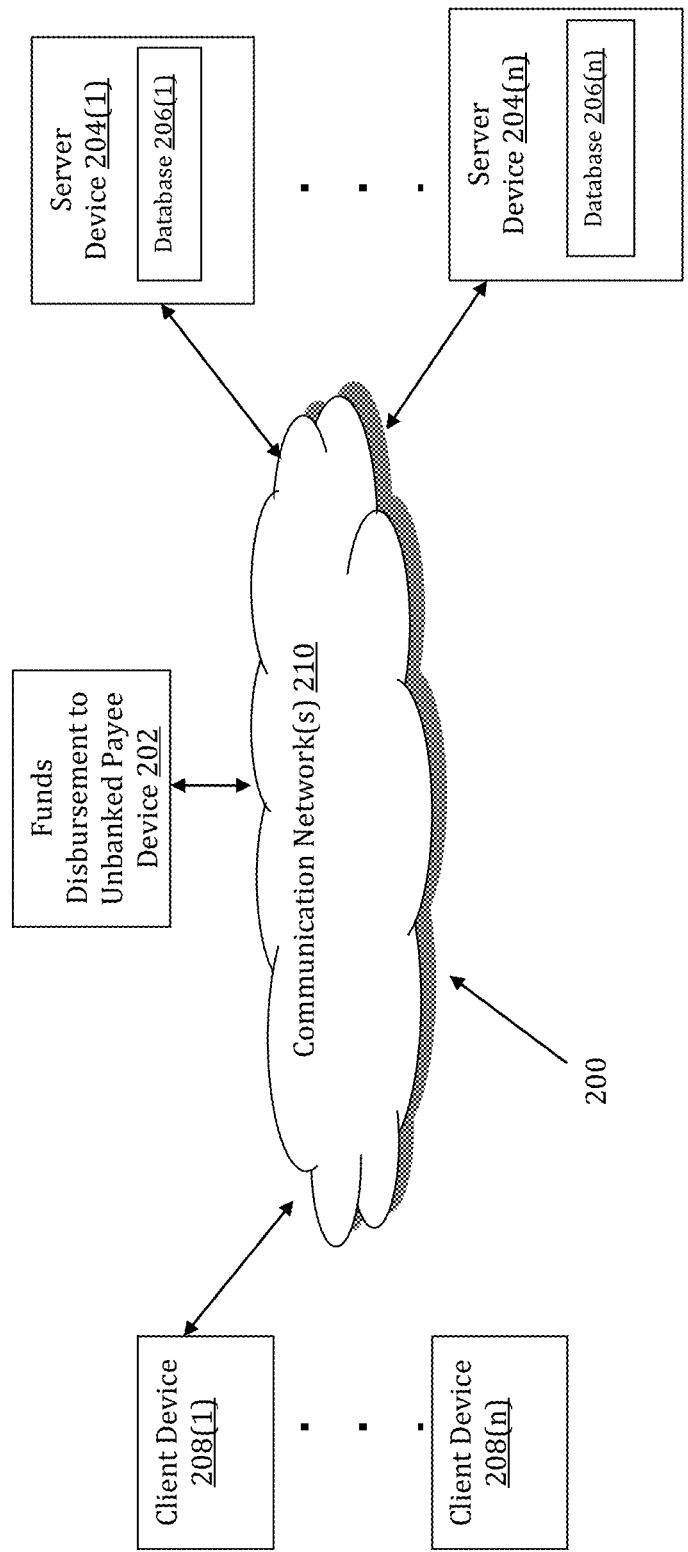
FIG. 2 illustrates an exemplary diagram of a network environment.

Referring to FIG. 2, a schematic of an exemplary network environment 200 for implementing a method for facilitating a disbursement of funds to a payee is illustrated. In an exemplary embodiment, the method is executable on any networked computer platform, such as, for example, a wireless mobile communication device, i.e., a smart phone.

The method for facilitating a disbursement of funds to a payee may be implemented by a Funds Disbursement to Unbanked Payee (FDUP) device 202. The FDUP device 202 may be the same or similar to the computer system 102 as described with respect to FIG. 1. The FDUP device 202 may store one or more applications that can include executable instructions that, when executed by the FDUP device 202, cause the FDUP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the FDUP device 202 itself, may be located in virtual server(s) running in a cloud-based computing environment rather than being tied to one or more specific physical network computing devices. Also, the application(s) may be running in one or more virtual machines (VMs) executing on the FDUP device 202. Additionally, in one or more embodiments of this technology, virtual machine(s) running on the FDUP device 202 may be managed or supervised by a hypervisor.

In the network environment 200 of FIG. 2, the FDUP device 202 is coupled to a plurality of server devices 204(1)-204(n) that hosts a plurality of databases 206(1)-206(n), and also to a plurality of client devices 208(1)-208(n) via communication network(s) 210. A communication interface of the FDUP device 202, such as the network interface 114 of the computer system 102 of FIG. 1, operatively couples and communicates between the FDUP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FDUP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and FDUP devices that efficiently facilitate disbursements of funds to payees.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FDUP device 202 may be a standalone device or integrated with one or more other devices or apparatuses, such as one or more of the server devices 204(1)-204(n), for example. In one particular example, the FDUP device 202 may include or be hosted by one of the server devices 204(1)-204(n), and other arrangements are also possible. Moreover, one or more of the devices of the FDUP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FDUP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store transaction data, payee authentication data, and any other data that relates to managing and administering a disbursement of funds to a payee.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the FDUP device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the FDUP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the FDUP device 202, the server devices 204(1)-204(n), or the client devices 208(1)-208(n), for example, may be configured to operate as virtual instances on the same physical machine. In other words, one or more of the FDUP device 202, the server devices 204(1)-204(n), or the client devices 208(1)-208(n) may operate on the same physical device rather than as separate devices communicating through communication network(s) 210. Additionally, there may be more or fewer FDUP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
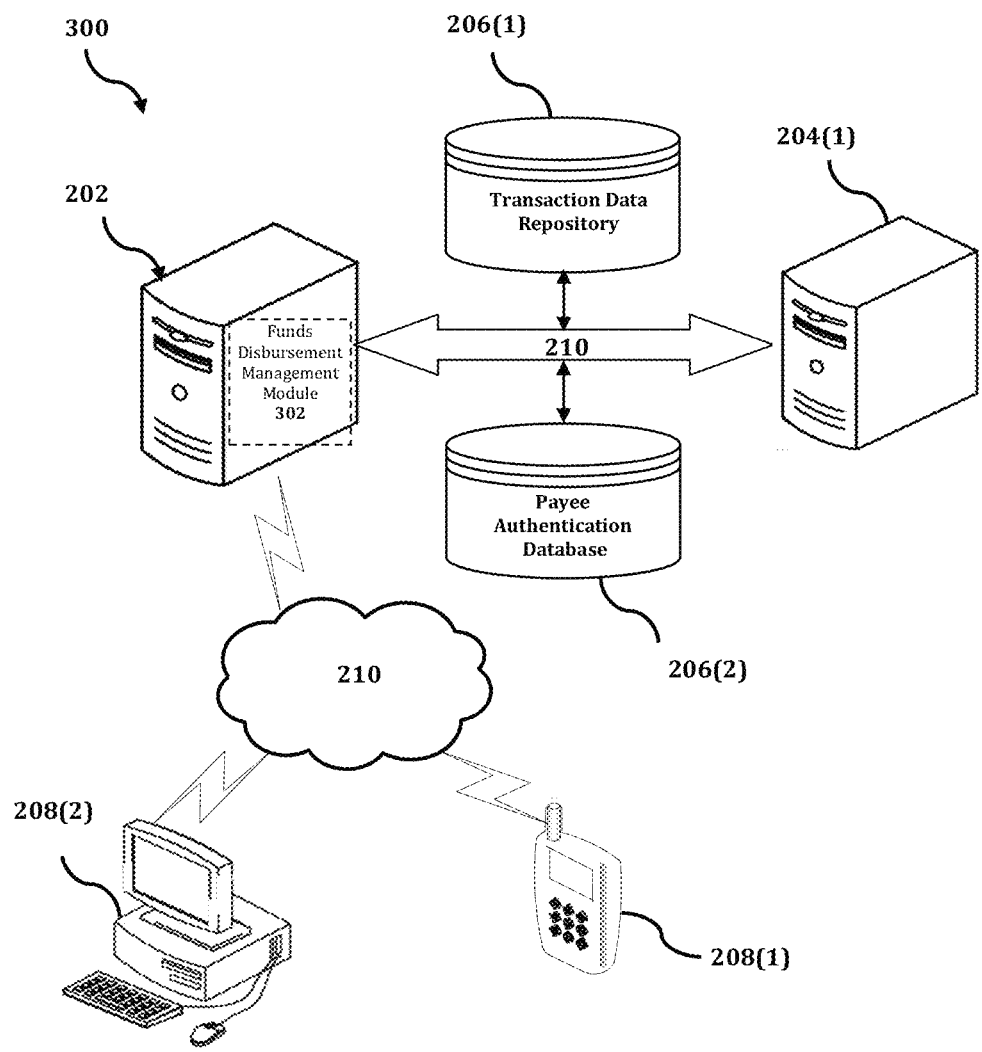
FIG. 3 shows an exemplary system for facilitating a disbursement of funds to a payee.

The FDUP device 202 is described and shown in FIG. 3 as including a funds disbursement service management module 302, although it may include other modules, databases, or applications, for example. As will be described below, the funds disbursement management module 302 is configured to process large numbers of funds disbursement requests in order to ensure that unbanked payees are able to receive payments in an automated, efficient, scalable, and reliable manner.

An exemplary process 300 for facilitating a disbursement of funds to a payee by utilizing the network environment of FIG. 2 is shown as being executed in FIG. 3. Specifically, a first client device 208(1) and a second client device 208(2) are illustrated as being in communication with FDUP device 202. In this regard, the first client device 208(1) and the second client device 208(2) may be "clients" of the FDUP device 202 and are described herein as such. Nevertheless, it is to be known and understood that the first client device 208(1) and/or the second client device 208(2) need not necessarily be "clients" of the FDUP device 202, or any entity described in association therewith herein. Any additional or alternative relationship may exist between either or both of the first client device 208(1) and the second client device 208(2) and the FDUP device 202, or no relationship may exist.

Further, FDUP device 202 is illustrated as being able to access a transaction data repository 206(1) and a payee authentications database 206(2). The funds disbursement management module 302 may be configured to access these databases for implementing a process for facilitating a disbursement of funds to a payee.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the FDUP device 202 via broadband or cellular communication. Of course, these embodiments are merely exemplary and are not limiting or exhaustive.

Upon being started, the funds disbursement management module 302 executes a process for facilitating a disbursement of funds to a payee. An exemplary process for facilitating a disbursement of funds to a payee is generally indicated at flowchart 400 in FIG. 4.

Figure 4:
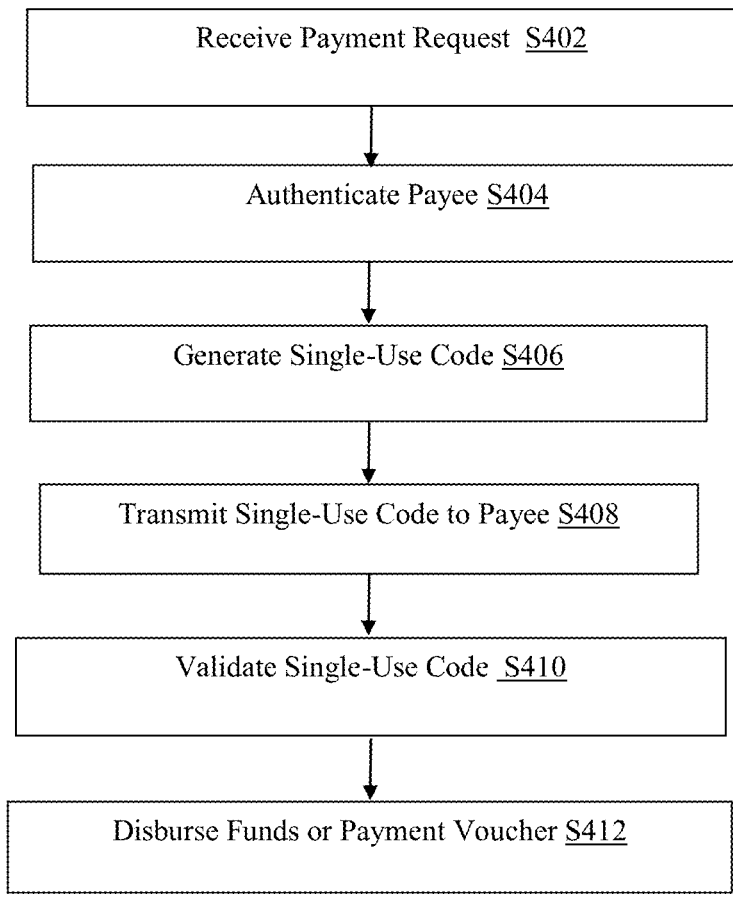
FIG. 4 is a flowchart of an exemplary method for facilitating a disbursement of funds to a payee.

In the process 400 of FIG. 4, at step S402, the funds disbursement management module 302 receives a request for a payment to be made to a payee on behalf of a corporate client. The payee may be an unbanked payee. In an exemplary embodiment, the request is received via a wireless mobile communication device, such as, for example, a smart phone.

At step S404, the funds disbursement management module 302 authenticates the payee. In an exemplary embodiment, any of several authentication methods may be used, such as, for example, using image data of the payee, using video data of the payee, obtaining a fingerprint scan of the payee and using fingerprint data, and using facial recognition techniques. Alternatively, an authentication may be performed by using a password, unique data such as a question/answer format, and/or any other suitable authentication method.

At step S406, the funds disbursement management module 302 generates a code that corresponds to the received payment request. In an exemplary embodiment, the code is a single-use code that is unusable after the first use. In addition, the single-use code may be configured to expire when a predetermined amount of time has elapsed after the generation of the code. For example, the single-use code may be configured to expire after one minute, 10 minutes, one hour, 24 hours, or 30 days. In an exemplary embodiment, the single-use code may include a barcode, a Quick Response (QR) code, a Near Field Communication (NFC) code, and/or a textual string that includes a sequence of alphanumerical characters.

At step S408, the funds disbursement management module 302 transmits the single-use code to the payee. In an exemplary embodiment, the single-use code is displayable on a screen of the payee's smart phone.

At step S410, when the payee enters the single-use code into a payment disbursement machine, such as, for example, an automatic teller machine (ATM), the funds disbursement module 302 validates the single-use code in order to ensure that the proper payee and the correct transaction details are involved in the transaction.

At step S412, the funds disbursement management module 302 prompts the payment disbursement machine to disburse the funds or a payment voucher to the payee. In an exemplary embodiment, a payment voucher may be disbursed in lieu of funds due to a restriction that is applicable to the payee or to the transaction, such as, for example, a funds availability restriction, an identification verification restriction, or a general payment disbursement machine restriction, i.e., a general ATM restriction. When the payment disbursement machine disburses a payment voucher instead of disbursing the funds, the payment voucher is redeemable at a corresponding financial institution by the payee.

Figure 5:
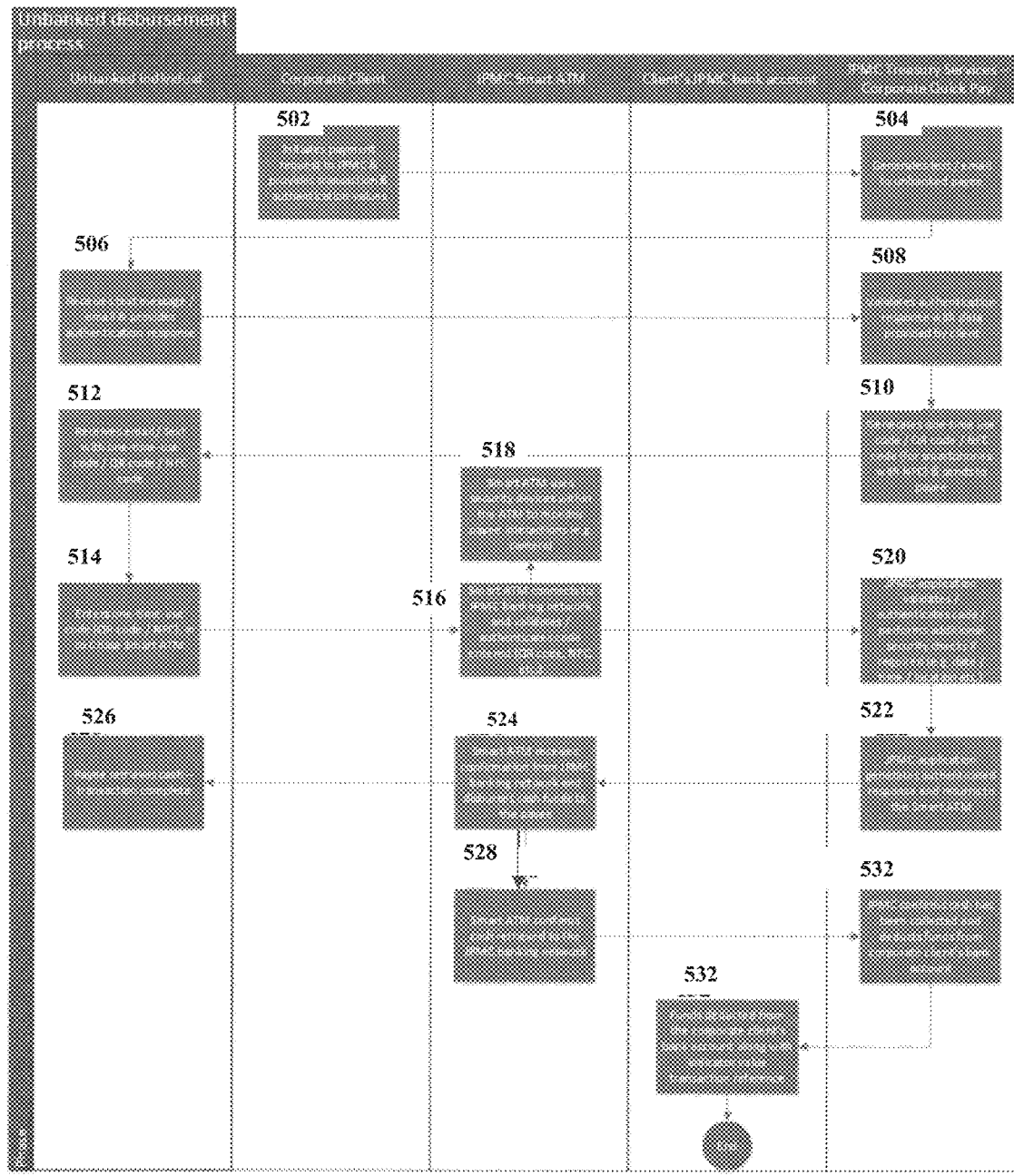
FIG. 5 illustrates a process flow diagram of a process for facilitating a disbursement of funds to a payee, according to an exemplary embodiment.

Referring to FIG. 5, a process flow diagram of a process 500 for facilitating a disbursement of funds to a payee is illustrated, according to an exemplary embodiment. The disbursement process 500 may be an unbanked disbursement process 500 and/or an underbanked disbursement process 500.

As described herein, the term "underbanked" describes persons and/or organizations that may not have sufficient access to financial services and products (e.g., mainstream financial services and products) that are traditionally offered by banks (e.g., retail banks and/or online banks). As described herein, the term "unbanked" describes persons and/or organizations that do not use banking services. It should be appreciated that the disbursement process 500 described herein may be utilized by both underbanked and unbanked people and organizations, and that references to the unbanked disbursement process 500 herein are for exemplary purposes only, and not for limiting said disbursement process 500 to a particular group of persons and/or organizations.

Unbanked disbursement process 500 illustrates the transfer of funds and authentication protocols required in a transaction between a corporate client and an unbanked payee, non-customer, or the like, according to an exemplary embodiment. In an exemplary embodiment, the unbanked disbursement process 500 further involves a unmanned payment disbursement system, such as, for example, an ATM (e.g., a Smart ATM), a bank account (actual, virtual, or otherwise) associated with the corporate client, and a bank treasury service. It is appreciated that in other embodiments, additional parties or entities may be involved in the disbursement process. It is appreciated that the entities involved in the unbanked disbursement process 500 are configured to communicate with each other over a network or networks such as the Internet, cellular data networks, or the like. In some embodiments, a virtual account may be used to mask the identity of the payee or the corporate client. A virtual account may be created for every transaction, and may be deleted upon completion of a transaction. In some embodiments, the virtual account corresponds to a randomly generated alphanumeric string of characters.

An unbanked individual or unbanked payee is any individual that does not have a bank account or desires to have payment funds disbursed as a cash instrument. A corporate client is any corporate entity with a relationship to a financial institution that wishes to disburse funds to individuals. The corporate entity has a bank account with the financial institution from which funds are drawn. A financial institution may be a bank or other payment processing entity. In some embodiments, the corporate client's bank account is a line of credit (virtual or actual) from which funds are disbursed. A Smart ATM is an Internet-connected Automated Teller Machine (ATM) that is, in addition to performing the traditional function of disbursement of cash, capable of transmitting and receiving information via a network to at least one financial institution server. In some embodiments, the Smart ATM has at least one camera and is configured to transmit and receive image and video data of a user or the physical surroundings of the Smart ATM. In some embodiments, the Smart ATM is configured to communicate with NFC-enabled devices, such as a smart phone or a tablet computer. In other embodiments, the Smart ATM is configured to accept input from biometric security devices such as a fingerprint reader, facial recognition cameras, optical scanners, etc. The Smart ATM may also include implementations of additional authentication procedures, such as Quick Response (QR) codes, text message authentication, or the like.

The unbanked disbursement process 500 begins when a corporate client initiates a payment request to a bank or similar financial institution at step 502. Payment request 502 may be made from a user interface that is accessible via the Internet or via an application on a smart phone or tablet/computer. In some embodiments, payment request 502 is uploaded via a batch upload or a call from an application programming interface (API). The corporate client provides transaction and authentication values as part of the request. In some embodiments, the authentication values are provided in a question and answer format. In some embodiments, the transaction and authentication values are randomly generated by at least one processor in communication with a memory. In some embodiments, the transaction and authentication values are randomly generated by the corporate client and transmitted to the financial institution.

After payment request 502 is initiated, the payment request is transmitted to the financial institution. The financial institution receives the payment request and the transaction and authentication values, generates a notification message, and transmits the notification message to the payee at step 504. The notification message may be any electronic message, including, for example, any one or more of a Short Message Service (SMS) text message, electronic mail (email) message, electronic chat message, Facebook instant or direct message, Twitter direct message, automated telephone call, and/or any other suitable message type. Other digital notification methods will be apparent to those of skill in the art.

At step 506, the payee receives the notification message from the financial institution and is prompted to provide an authentication response that corresponds to the authentication values generated at payment request 502. In some embodiments, the authentication values are in the form of questions and answers. Authentication values may also be in the form of a challenge-response test, such as CAPTCHA or similar human verification methods.

In some embodiments, the authentication values will initiate an interaction with a different application than the application in which the message was received. For example, if the message is received by the payee on a smart phone, the notification message may include a link to launch an additional authentication application, such as Last Pass, OnePass, Google Authenticator, or another suitable application.

After a response is registered to the authentication prompt and transmitted to the financial institution, at step 508, the financial institution validates or confirms that the authentication values submitted by the payee correspond to the authentication values generated by the corporate client.

In some embodiments, at step 506, the payee is redirected to a Treasury Services application (such as Corporate Quick Pay) in which the payee enters a challenge answer. The notification may include an Internet hyperlink which may be directed to an application in order to enter a challenge answer. In some embodiments, the Treasury Services application is configured to prompt the payee to enter existing bank account details for disbursement to an existing bank account, or allow for the payee to choose a cash disbursement to an ATM.

After validation of the authentication values is performed at step 508, then at step 510, the financial institution generates a one-time use code (also referred to herein as a "single-use code) and transmits the code to the payee. The one-time use code that is generated may comprise any of a series of randomly generated alphanumeric characters, a Quick Response (QR) code or other barcode, a Near-Field Communication (NFC) code, and/or any other suitable type of code. Other types of authentication codes will be apparent to those of skill in the art.

In some embodiments, the one-time use code will change after a predetermined period of time, e.g., every five minutes, at which time a new one-time code will be generated. It will be appreciated that the one-time use code is configured to be utilized only one time, with respect to the current transaction, and that that the one-time code is unusable after the first use. In some embodiments, the one-time use code may be transmitted to the payee in more than one format, for example, a text message and an email. In some embodiments, a plurality of one-time use codes are generated and transmitted to the payee in different formats, for example, a text message and an email, for the purposes of multi-factor authentication.

At step 512, the payee receives the one-time use code generated by the financial institution. In some embodiments, the one-time use code may be time sensitive, and may thus expire after a predetermined amount of time has elapsed. For example, the one-time use code may be usable for only 15 minutes, 30 minutes, or an hour after transmission. After such time has elapsed without use, the financial institution may transmit a notification back to the payee and/or the corporate client in order to indicate that the transaction has been cancelled.

At step 514, the payee enters the one-time use code at a Smart ATM affiliated with the financial institution. A Smart ATM is an ATM that is affiliated with a financial institution and configured to receive and transmit information over a network to a server that is affiliated with the financial institution. In some embodiments, in step 518, the Smart ATM is configured to monitor a payee transaction at an interaction monitor. In some embodiments, the Smart ATM is configured to collect additional authentication data, such as image or video data, fingerprint scan data, facial recognition data, and/or any other suitable type of authentication data.

After the one-time use code is entered or used at the Smart ATM at step 514, then at step 516, the Smart ATM connects to the financial institution network and validates or confirms that the one-time use code entered by the payee matches the one-time use code generated by the financial institution at step 510.

In some embodiments, code verification 516 relies on multi-factor authentication, and will prompt the payee for additional authenticating information, such as payee name, address, Social Security Number, etc. If the one-time use code entered is not correct or not able to be properly validated, the Smart ATM will end the transaction. In some embodiments, the Smart ATM is configured to transmit image or video data to the corporate client or financial institution in the event of a failed authentication.

After the one-time use code is authenticated at step 516, the Smart ATM is configured to communicate with the financial institution over a network to confirm that the code has been used by the payee and properly authenticated. At step 520, the financial institution receives transaction information from the Smart ATM and validates or confirms the use of the one-time use code. In some embodiments, the financial institution performs additional validation or authentication procedures, such as confirming date, time, location, etc., that relate to the use of the one-time use code.

Once the validation check is completed, then at step 522, the financial institution generates an authenticated response and transmits the response to the Smart ATM. In some embodiments, the authenticated response includes a randomly generated transaction identifier that is used to identify the transaction, corporate client, and/or payee.

At step 524, the Smart ATM receives the authentication verification from the financial institution and disburses a voucher and/or cash to the payee. In some embodiments, the Smart ATM is configured to collect image or video data at the time of disbursement and transmit the data to the corporate client or financial institution for further verification and recordation relating to the transaction. In some embodiments, the image and/or video data may be accessed, for example, via a user device and transmitted to the Smart ATM and/or the financial institution.

At step 526, the payee retrieves the voucher and/or cash as it is disbursed from the Smart ATM. In some embodiments, the payee may be sent a notification or confirmation via a text message or email regarding the successful completion of the disbursement.

In some embodiments, the Smart ATM has sensors which are configured to verify that the voucher and/or cash has been retrieved from the disbursement slot. In some embodiments, the financial institution may reject the transaction due to transactional failures. In situations where the funds are not collected, the Smart ATM may be configured to return the cash, and a response is returned to the financial institution to indicate that the funds should not be deducted from the client account.

In some embodiments, a disbursement of the voucher may be performed in response to one or more disbursement restrictions that are identified, for example, via the Smart ATM. The disbursement restrictions may include, for example, a funds availability restriction, an identification verification restriction, and/or a general disbursement restriction associated with the ATM and/or Smart ATM. In some embodiments, for example, the general disbursement restrictions may be associated with maintenance of the Smart ATM. Additionally, or alternatively, the general disbursement restriction may be related to a Smart ATM error that is not related to the payee and/or the payee's transaction, and/or any other disbursement restriction known to persons of ordinary skill in the art and capable of restricting disbursement of funds (e.g., cash) to the payee.

It should be appreciated that any restrictions may be transmitted to the payee prior to the payee interfacing with the ATM, for example, via the user device. In this case, the payee may be prompted to use the generated use code at the financial institution (e.g., via a human teller) instead of at the Smart ATM.

At step 528, the Smart ATM generates a confirmation message that indicates that the cash has been successfully retrieved by the payee, and transmits the confirmation message to the financial institution. In some embodiments, a confirmation message is sent to the payee or corporate client.

At step 530, the financial institution verifies or confirms that the appropriate cash disbursement has been made and deducts the appropriate amount of funds from the corporate client's account with the financial institution. After the funds have been deducted from the client account, an indicator value transaction reference is generated at step 532 and stored in connection with the client account.

Accordingly, with this technology, an optimized process for facilitating a disbursement of funds to a payee is provided. The optimized process enables an unbanked payee to efficiently and automatically obtain access to a disbursement of funds.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating a disbursement of funds to a payee, the method being implemented by a processor on a computing device, the method comprising:
   receiving a payment request from a payor via at least one from among a user interface and an application programming interface;
   redirecting the payee to a different application programming interface to provide an authentication response that corresponds to the authentication values generated at payment request;
   validating the authentication values;
   after the validation of the authentication values, automatically generating a code that includes a machine-readable code and a human-readable code that corresponds to the received payment request by:
      encoding a set of instructions for execution by the processor;
      associating a sequence of alphanumerical characters with at least one attribute, the at least one attribute including an expiration time attribute;
      automatically generating the code based on the associated sequence of alphanumerical characters;
      configuring the generated code to be displayable on at least one payee device;

determining whether the generated code has expired based on a current time and the expiration time attribute; and when the generated code has expired, causing the at least one payee device to block use of the generated code by generating a new code to replace the generated code;

transmitting the new generated code to the payee;

authenticating the payee at a payment disbursement machine by validating the code when the code is entered into the payment disbursement machine;

transmitting an authenticated response to the payment disbursement machine based on a result of the validating; and disbursing at least one of the funds and a payment voucher via the payment disbursement machine.

2. The method of claim 1, wherein the payment disbursement machine is an automated teller machine (ATM).

3. The method of claim 1, wherein the payment request is received from the payor via a wireless mobile communication device.

4. The method of claim 1, wherein the disbursing comprises disbursing the payment voucher when at least one of a funds availability restriction, an identification verification restriction, and a general payment disbursement machine restriction is applicable to the payee.

5. The method of claim 4, wherein the payment voucher is redeemable at a financial institution for facilitating the disbursement of funds.

6. The method of claim 1, wherein the code is a single-use code that is unusable after a first use.

7. The method of claim 6, wherein the single-use code is configured to expire when a predetermined amount of time has elapsed from the generating of the code.

8. The method of claim 1, further comprising authenticating the payee after receiving the payment request and before generating the code.

9. The method of claim 8, wherein the authenticating comprises using image data of the payee, using video data of the payee, using fingerprint data of the payee, and using facial recognition data of the payee.

10. The method of claim 1, wherein the code includes at least one of a barcode, a Quick Response (QR) code, a Near Field Communication (NFC) code, and a textual string.

11. A computing device configured to implement an execution of a method for facilitating a disbursement of funds to a payee, the computing device comprising:
a display screen;
a processor;
a memory; and
a communication interface coupled to each of the processor, the memory, and the display screen,
wherein the processor is configured to:
receive a payment request from a payor via at least one from among a user interface and an application programming interface;
redirect the payee to a different application programming interface to provide an authentication response that corresponds to the authentication values generated at payment request;
validate the authentication values;
after the validation of the authentication values, automatically generate a code that includes a machine-readable code and a human-readable code that corresponds to the received payment request by causing another processor to:
encode a set of instructions for execution by the processor;
associate a sequence of alphanumerical characters with at least one attribute, the at least one attribute including an expiration time attribute;
automatically generate the code based on the associated sequence of alphanumerical characters;
configure the generated code to be displayable on at least one payee device;
determine whether the generated code has expired based on a current time and the expiration time attribute; and
when the generated code has expired, causing the at least one payee device to block use of the generated code by generating a new code to replace the generated code;
transmit the new generated code to the payee;
validate the code when the code is entered into a payment disbursement machine;
transmit an authenticated response to the payment disbursement machine based on a result of the validating; and
effect the disbursement of at least one of the funds and a payment voucher via the payment disbursement machine.

12. The computing device of claim 11, wherein the payment disbursement machine is an automated teller machine (ATM).

13. The computing device of claim 11, wherein the payment request is received from the payor via a wireless mobile communication device.

14. The computing device of claim 11, wherein the processor is further configured to effect the disbursement of the payment voucher when at least one of a funds availability restriction, an identification verification restriction, and a general payment disbursement machine restriction is applicable to the payee.

15. The computing device of claim 14, wherein the payment voucher is redeemable at a financial institution for facilitating the disbursement of funds.

16. The computing device of claim 11, wherein the code is a single-use code that is unusable after a first use.

17. The computing device of claim 16, wherein the single-use code is configured to expire when a predetermined amount of time has elapsed from a time at which the code is generated.

18. The computing device of claim 11, wherein the processor is further configured to authenticate the payee after the payment request is received and before the code is generated.

19. The computing device of claim 18, wherein the processor is further configured to authenticate the payee by using at least one of image data of the payee, video data of the payee, fingerprint data of the payee, and facial recognition data of the payee.

20. The computing device of claim 11, wherein the code includes at least one of a barcode, a Quick Response (QR) code, a Near Field Communication (NFC) code, and a textual string.

* * * * *